…

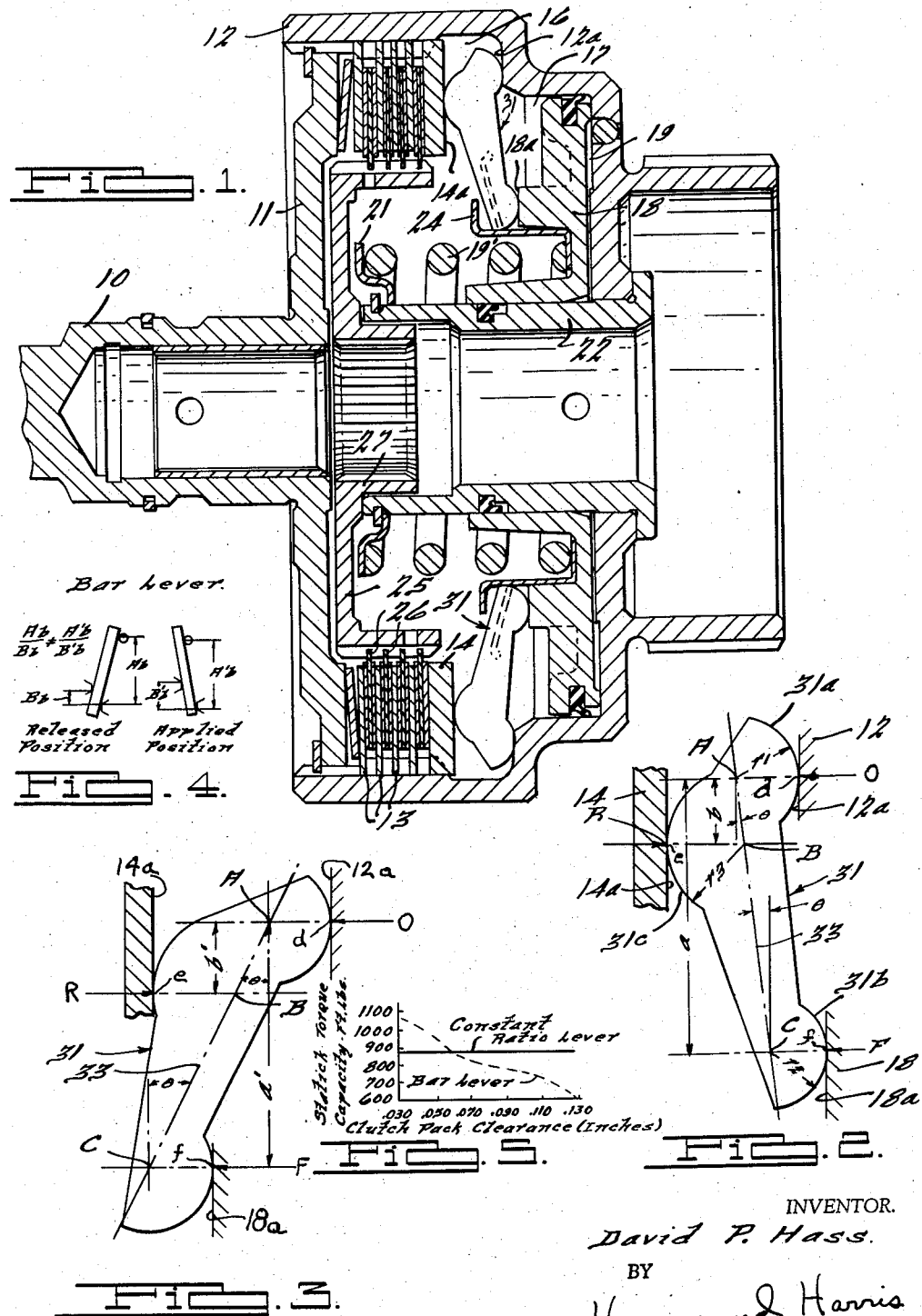

United States Patent Office 2,880,835
Patented Apr. 7, 1959

2,880,835

CONSTANT RATIO CLUTCH LEVER SYSTEM

David P. Hass, Oak Park, Mich., assignor to Chrysler Corporation, Highland Park, Mich., a corporation of Delaware Application January 10, 1957, Serial No. 633,487

1 Claim. (Cl. 192—99)

This invention relates to friction clutch or brake mechanisms and particularly to the lever means for applying the actuating force to the clutch or brake mechanisms.

It is a primary object of this invention to provide a lever operated friction clutch or brake mechanism wherein the levers used to apply the actuating force are designed and arranged such that the lever ratio remains constant over a wide range of lever movement.

It is another object of this invention to provide a transmission clutch having piston actuated lever means arranged to multiply the clutch applying force such that the lever ratio remains constant, regardless of piston position, in order that the clutch torque capacity will remain in a constant ratio with respect to the clutch applying force.

It is still another object of this invention to provide a force multiplying lever system operable over a wide range of lever movement wherein the lever ratio will remain constant throughout the lever operating range.

Other objects and advantages of this invention will become apparent from a reading of the following description and a consideration of the related drawings wherein:

Fig. 1 is a sectional elevational view of a pressure fluid operated friction clutch mechanism having lever means embodying this invention;

Fig. 2 is an enlarged fragmentary view of the lever element shown in Fig. 1, the lever being shown in the clutch disengaged position;

Fig. 3 is a fragmentary view, similar to Fig. 2, but showing the lever in clutch engaged position;

Fig. 4 is a diagrammatic view of a conventional bar lever system with the lever being shown in both engaged and disengaged positions; and Fig. 5 is a graph showing the comparison of the bar lever system with the constant ratio lever system.

In a large number of present day automatic motor vehicle power transmission units the various clutches used in such transmissions include friction discs that are actuated by hydraulic pressure. The clutch actuating hydraulic pressure is applied to a shiftable piston that actuates a system of levers to cause compressing movement of a shiftable pressure plate against the friction disc or discs of the clutch unit. Usually the clutch actuating pressure is modulated by a torque sensing device to match clutch capacity with transmission input torque so as to insure a smooth clutch engagement. If a lever system is used to multiply the piston applied clutch actuating force, it is imperative that the lever ratio remain constant, regardless of the relative position of the piston and clutch pressure plate, in order that the clutch torque capacity remain in a constant ratio with respect to the clutch actuating force.

Investigation of lever actuated clutch mechanisms has shown that the lever ratio, and consequently the clutch torque capacity, is affected by clutch disc clearance, wear and deflection, as well as by variation in lever shape, arrangement, and magnitude of operating range. As a result of these investigations, a constant ratio lever has been developed that is substantially unaffected by variation in the aforenoted clutch properties and characteristics. This constant ratio lever with its constant torque capacity over a wide range of clutch disc clearances gives minimum piston travel to take up the disc clearances because the lever is not penalized by an excessively high ratio in the low clearance range. Accordingly, the piston travel efficiency permits elimination of the selective assembly of the clutch disc pack and its associated snap ring to meet existing clutch tolerance and torque capacity requirements. As a result of the elimination of selective assembly of the clutch elements, clutch costs can be materially reduced. Furthermore, because of the constant ratio lever arrangement an improved clutch is assured regardless of variation in clutch components.

Fig. 1 of the drawings shows a conventional type of pressure fluid operated friction disc clutch assembly. This assembly includes an input shaft 10 having a radial flange 11 that drivingly mounts a drum element 12. Drum element 12 has a plurality of friction discs 13 drivingly keyed to its inner peripheral surface. Also drivingly keyed to the inner periphery of the drum 12 is a pressure plate 14. Pressure plate 14 is arranged to be shifted axially of the drum 12 so that the friction discs 13 may be compressed between the pressure plate 14 and the flange 11.

Drum 12 is shaped to provide an area 16, that receives a plurality of clutch disc levers 31. Drum 12 is also shaped to provide a cylinder bore 17 that receives an axially shiftable clutch actuating piston 18. Pressure fluid is adapted to be introduced into the cylinder bore portion 19 to cause forward or leftward clutch engaging movement of the piston 18. A compression spring 19' extends between a seat 21 on drum cylinder sleeve 22 and the rear face of piston 18 to normally urge the piston 18 to clutch disengaged position. Also mounted on the rear face of piston 18 is a flanged ring 24 that is adapted to support the aforementioned clutch disc actuating levers 31.

Mounted concentrically within the drum 12 is a flanged spider plate 25. Spider plate 25 has drivingly mounted on its outer periphery a plurality of friction discs 26 that are adapted to be drivingly engaged with the aforementioned, drum mounted friction discs 13. The hub 27 of spider plate 25 is internally splined to provide for driving connection of the spider plate to a driven shaft that is not shown. For purposes of this description the drum 12 may be considered the input or driving clutch element whereas the spider plate 25 may be considered the output or driven clutch element. Obviously reversal of the direction of drive will not affect the manner of operation of the clutch.

The structure embodying this invention is associated with the clutch disc actuating levers 31. Preferably three or more of such levers are uniformly spaced around the periphery of the drum 12. Each lever 31 (see Figs. 2 and 3) is formed with three bearing surfaces, namely, a fulcrum surface 31a, a force applying surface 31b and a reaction surface 31c. The fulcrum surface 31a of each lever 31 is a segment of a circle having a radius $r_1$. Lever fulcrum surface 31a is adapted to roll and slide on the radially extending wall portion 12a of the drum 12. The force applying surface 31b of each lever is a segment of a circle having a radius $r_2$. Lever force applying surface 31b is adapted to roll and slide on the radially extending wall portion 18a of the force applying piston 18. The reaction surface 31c of each lever 31 is a segment of a circle having a radius $r_3$. Lever reaction surface 31c is adapted to roll and slide on the radially extending wall portion 14a of the shiftable pressure plate 14.

From Figs. 2 and 3 it will be noted that the lever surface curvature centers A, B and C for the radii $r_1$, $r_2$ and $r_3$ are located along the same straight line 33. It will also be noted that the various surfaces 12a, 18a and 14a along which the lever surfaces 31a, 31b and 31c shift, during clutch engagement and disengagement, are parallel surfaces. This combination of having the centers of generation A, B, C of the several curved surfaces of the lever lying along the same straight line 33 and the reaction or bearing surfaces 12a, 18a, 14a that are engaged by the lever curved surfaces 31a, 31b and 31c parallelly arranged gives a geometry that provides a constant ratio lever system. Because of this novel arrangement, it will be found from a study of Figs. 2 and 3, which figures show the lever 31 in clutch released and clutch engaged positions respectively, that the following relationship exists. Also, this same constant ratio relationship will exist for any lever positions between clutch engaged and clutch released positions:

$$\frac{a}{b} = \frac{AC \cos \theta}{AB \cos \theta}$$

Fig. 4 of the drawings is a diagrammatic showing of a conventional bar lever clutch actuating system. It will be noted that with such a bar lever system the levers go over center in going from a clutch released to a clutch applied position. Accordingly, the lever ratio falls off because the levers pivot on new centers of reduced ratios. Accordingly, the ratio of $A_b$ to $B_b$ is not equal to the ratio of $A'_b$ to $B'_b$. This bar lever arrangement may be expressed by the formula:

$$\frac{A_b}{B_b} \neq \frac{A'_b}{B'_b}$$

The improved torque capacity achieved as a result of the use of the constant ratio lever system is thought to be graphically pointed out by Fig. 5. From this graph it will be noted that the clutch torque capacity remains constant regardless of the amount of clutch pack clearance. Expressed another way the torque capacity is independent of the range or degree of piston or lever actuator movement. Because of the elimination of drop-off in torque capacity when a constant ratio lever system is used it has been possible to eliminate twenty percent (20%) of the clutch discs heretofore required in the forward drive clutch of one of the present day large production motor vehicle automatic power transmission units. While this invention is shown embodied in a pressure fluid operated clutch device, still, it is thought to be obvious that the lever arrangement is usable in any type of clutch or friction device whether it be power operated or manually or driver operated by directly applied effort.

It is thought to be obvious from the foregoing description of this improved clutch lever system that the contact points d, e and f, where the forces O, R and F are applied, will shift along the curved lever surfaces 31a, 31b and 31c respectively during lever actuation. However, for all lever positions the lever ratio is constant. Because of this constant lever ratio relationship it is possible to use the clutch friction elements to their greatest advantage and thereby reduce the number of required friction elements and at the same time insure a more predictable and improved clutch operation.

I claim:

A friction clutch comprising relatively rotatable driving and drive nmembers, friction elements drivingly mounted on each of said members and adapted to be frictionally engaged to drivingly interconnect said members, a pressure plate shiftably mounted on one of said members and arranged to be shifted to effect frictional engagement of said friction elements, and lever means operable to shift said pressure plate, means mounting said lever for movement lengthwise thereof in all positions thereof, said lever means having a fulcrum portion shiftably mounted on a surface of one of said members for movement lengthwise of said lever, a reaction portion engageable with and shiftably mounted on a surface of the pressure plate for movement lengthwise of said lever to effect shifting movement thereof, an actuator for said lever means, and a force applying portion engageable with and shiftably movable along a surface of the lever actuator during movement of the lever through its operating range, said lever portions being shaped and arranged to provide a constant ratio lever throughout the lever operating range with the several lever portions being spaced lengthwise of the lever and each comprising a surface of curvature having a center of generation that is located on a straight line extending lengthwise of the lever that also includes the centers of generation of said other lever portions, and wherein the surfaces engaged by the lever fulcrum portion, reaction portion and force applying portion are parallel to one another.

References Cited in the file of this patent

UNITED STATES PATENTS

| 1,665,554 | Kolb | Apr. 10, 1928 |
| 2,275,204 | Smirl | Mar. 3, 1942 |

FOREIGN PATENTS

| 725,688 | Great Britain | Mar. 9, 1955 |